Patented Oct. 3, 1950

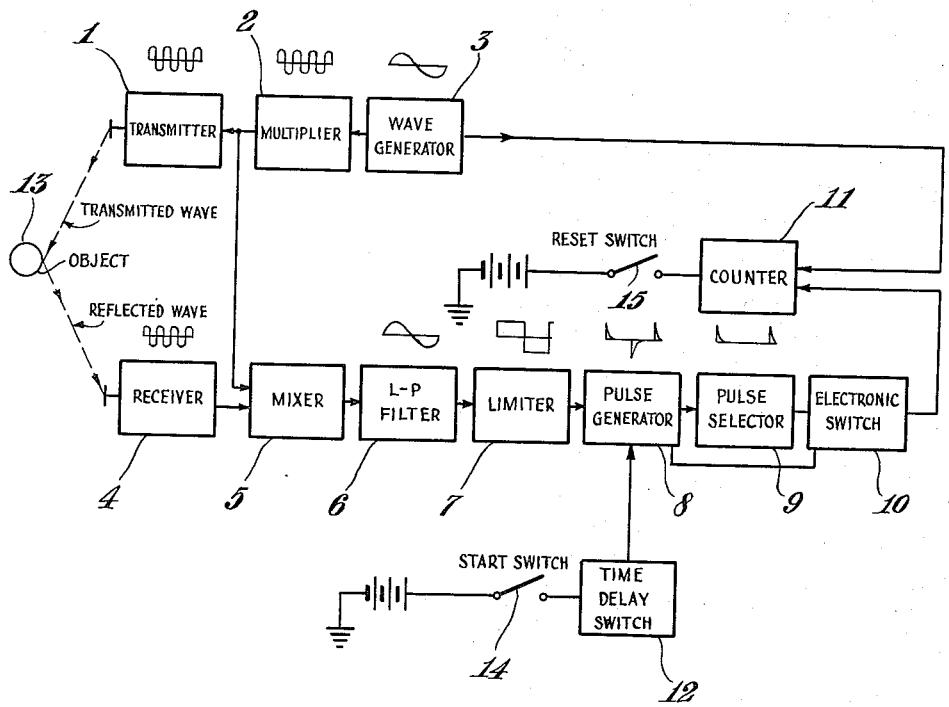

2,524,610

UNITED STATES PATENT OFFICE 2,524,610

RADIANT ENERGY METHOD AND APPARATUS FOR MEASURING THE VELOCITY OF MOVING BODIES

André Willem Storm and Gerrit Mak, Sydney, New South Wales, Australia, assignors to Hartford National Bank & Trust Company, Hartford, Conn., as trustee Application September 10, 1945, Serial No. 615,262
In Australia June 8, 1944

10 Claims. (Cl. 343—8)

This invention relates to the measurement of velocities of a comparatively high order such as those attained by artillery projectiles while in flight and by aircraft.

In the measurement of these velocities radio waves of a suitable frequency may be transmitted along the path of, and following the moving object and will be reflected by the object. The reflected waves may be received by a receiver located in line with the path of the object, but behind it, and may then be mixed with waves of the frequency radiated by the transmitter. The mixing of these two frequencies produces a beat frequency which is a function of the velocity of the moving body, the velocity of radio waves, and the frequency of the waves emitted by the transmitter. The relationship between these factors may be conveniently expressed by means of the following formula which is derived from the well known formula describing the "Doppler effect."

$$V = v \frac{f}{2F}$$

wherein $V$ = velocity of the moving body
$v$ = velocity of radio waves (300,000,000 metres per second)
$F$ = radiated frequency
$f$ = difference between radiated and received frequencies.

Two major difficulties are encountered when endeavouring to measure velocities by the method described in the foregoing. Firstly, the time of duration of the beat frequency may be extremely short, and consequently direct measurement becomes difficult. Secondly, the difference frequency depends not only upon the velocity of the moving object but also upon the frequency of the radiated waves which must therefore be kept constant if the actual velocity is to be calculated by means of the difference frequency alone.

These two difficulties may be minimized in the following manner.

If, instead of utilizing the actual difference frequency, for the measurement of velocities the ratio of the difference frequency to the radiated frequency be utilized, errors due to variations in the radiated frequency will no longer be of importance. Furthermore, if a graphical record of the observations is made, difficulties due to the short duration of the beat frequency are avoided.

In a preferred embodiment of the invention a high frequency radio transmitter is situated at some fixed point with respect to which the velocity of a moving body is to be measured. A suitable receiver is situated at a point adjacent to the transmitter. The radio waves travel at a known speed towards the moving body and are reflected to the receiver. It will be found that due to the Doppler effect the reflected wave will have a frequency different from that of the transmitted wave.

If $f_1$ is the transmitted wave
$f_2$ the reflected wave
$V$ the velocity of the moving object
$v$ the velocity of radio waves, then $$f_2 = f_1 \left(1 \pm \frac{2V}{v}\right)$$

The positive sign should be used when the body is travelling towards the transmitter and the receiver and the negative sign should be used when the body is travelling in a direction away from the transmitter and the receiver.

The difference frequency $f_3$ is equal to $f_1-f_2$ or $f_2-f_1$, is obtained by modulating $f_1$ with $f_2$ in a conventional modulator followed by a low pass filter, and has the value $$\frac{2V f_1}{v}$$

The ratio between $f_3$ and $f_1$ is $$\frac{2V}{v}$$

In this expression the original frequency $f_1$ has been cancelled out and therefore the frequency $f_1$ has no influence on any measurements, employing this ratio provided that $f_1$ does not change considerably during the time required for the wave to travel from the transmitter to the moving object and back to the receiver. However, even with ordinary resonant circuits, the change in frequency during this time is so small that the resulting inaccuracy is negligible. Furthermore, if desired, the frequency $f_1$ may be controlled by a crystal.

From the equation $$\frac{f_3}{f_1} = \frac{2V}{v}$$

$V$ can be calculated if $$\frac{f_3}{f_1}$$

is known, as the velocity of radio waves, $v$ is a known quantity.

In the preferred form of the invention the ratio $$\frac{f_3}{f_1}$$

is measured by means of an electronic counter and an electronic switch. The electronic switch is actuated and stopped by two successive positive or negative half cycles of the frequency $f_3$ and is connected to the electronic counter in such a way that the counter is started and stopped by the switch. The counter is also connected with the source of the frequency $f_1$ and the number of cycles of frequency $f_1$ occurring during each cycle of frequency $F_3$ are counted. The reciprocal of this number is the required ratio $$\frac{f_3}{f_1}$$

and from the equation $$V = \frac{f_3}{f_1} \frac{v}{2}$$

the value of V can be calculated.

In practice, the number of cycles of a suitable sub-harmonic of the frequency $f_1$ or a multiple of a sub-harmonic will be counted instead of the number of cycles of the frequency itself at the frequency of $f_1$ is usually too high for its cycles to be counted by conventional counters. Furthermore, accuracy does not warrant the counting of the great number of cycles that would result if the cycles of the frequency $f_1$ were counted.

To illustrate the above, let the transmitted frequency be 100 megacycles and the speed of the moving body about 1000 feet per second; then the frequency $f_3$ will be in the order of 200 cycles per second.

The time for one cycle of a frequency of 200 cycles is 1/200 of a second. The number of cycles of a 100 megacycle wave in that time would be 500,000. This would give an unnecessarily high accuracy of 1 in 500,000.

An accuracy of 1 in 1000 is usually sufficient and for that reason the number of cycles of a suitable sub-harmonic of the frequency, say a frequency of 200 kilocycles, will be counted instead of the number of cycles of the frequency itself.

For slower moving objects a lower sub-harmonic of the frequency $f_1$ may be used, so that the total number of cycles counted will be about 1000. The expression for the speed of the moving body then becomes $$V = \frac{v}{2} \frac{1}{nr}$$

where

V is the velocity of the moving body
$v$ is the velocity of the radio waves
$n$ is the number of cycles counted by the counter and
$r$ is the ratio of the frequency $f_1$ to the frequency of the sub-hamonic used.

The electronic switch should open and close on two successive positive or negative half cycles of the frequency $f_3$.

It will be appreciated, however, that it is possible to operate the switch on any positive or negative half cycle of the frequency $f_3$.

The electronic switch may be connected to a conventional time delay circuit or circuits which will keep the switch inoperative for a predetermined period of time. After that an incoming frequency $f_3$ will operate the switch. This arrangement makes possible the measuring, for instance, of the speed of a bullet during flight, by using a plurality of electronic counters and associated electronic switches. The time delay circuits are arranged so that during the time of flight of the bullet each counter is made operative after a predetermined time interval after the bullet has been "fired."

To overcome false indications the electronic switch is also connected to a pulse selector whose task is to keep the switch inoperative for the first positive-negative half cycle or the part of the positive-negative half cycle coming through after the time delay circuits permit the operation of the switch, as such operation may occur in the middle of a positive or negative half cycle of the incoming frequency $f_3$ which would result in a false indication.

While the foregoing description of the invention is based upon the use of radio waves, the invention may be applied to apparatus using sound or other waves.

The invention will now be described with the aid of the accompanying drawing which shows in block form apparatus in accordance with the invention.

In the drawing the numeral 1 indicates a radiator or transmitter of high frequency waves. The frequency of these waves may be a harmonic of the frequency of the alternating current generator 3, which is multiplied by the multiplier 2. Alternatively, the frequency may be approximately stabilized by any suitable means, wherein the numeral 2 may indicate a frequency divider and the numeral 3 another frequency divider and so on. The general arrangement when radio waves are employed is preferably such as to make available two frequencies, one for radiation and reflection and the other for the operation of the measuring equipment which is hereinafter described. In certain circumstances such as when sound waves are employed these two frequencies may be identical.

The waves radiated from the transmitter 1 are reflected by the moving body 13 and it is the object of the invention to measure the velocity of the body 13. By reflected waves is meant waves which are either cast back or re-radiated by the moving body.

The reflected waves are received by a receiver 4 and passed on to a modulator 5 to which waves of the transmitted frequency are also applied from the output circuit of the multiplier. The two waves are mixed in the modulator 5 to produce the difference or beat frequency. This beat frequency is passed through a low pass filter 6 and thence through a limiter 7, whose output will be square waves free from amplitude modulation and of the same frequency as the beat frequency.

These square waves are applied to the pulse generator 8. The pulse generator 8 essentially consists of an electrical differentiating circuit such as, for example, a filter having a relatively small capacity condenser in the input series arm and a resistance of relatively small value in the output shunt arm. In the present case, the filter forms a portion of a resistance capacity amplifier which derives its anode potential from an electronic switch 10 described later.

The output from the pulse generator 8 is applied to the pulse selector 9 which consists of a repeating or amplifying vacuum tube in combination with a trigger circuit, the arrangement being such that the amplifier does not repeat the first positive or negative pulse applied to it.

The output of the amplifier in the pulse selector 9 is fed to an electronic switch 10 which supplies power to, or otherwise controls, the pulse generator 8. This electronic switch may consist of a trigger circuit operated by the second last measuring pulse and so isolates the measuring equipment after an effective cycle has been dealt with.

A suitable sub-harmonic of the radiated frequency, such as the output of oscillator 3, is applied to the electric counter 11 and the number of cycles which pass to the counter is controlled by the time interval between the two measuring pulses derived from the pulse generator 8. This number of cycles bears a simple relationship to the ratio between the radiated frequency and the beat frequency i. e. a simple relationship to the velocity to be measured as has been previously explained.

The counter 11 may be of any known type such as the well known counter used with Geiger tubes equipped with trigger circuits operated by the measuring pulses.

A start switch 14, may be provided to control the pulse generator 8 or some preceding portion of the equipment. This start switch may be operated by any means, such as the report of a gun, the output of a photo-electric cell, or other suitable automatic arrangements. Preferably the start switch controls the pulse generator via a time delay switch 12.

In addition, it is convenient to instal a reset switch 15 which can re-set the equipment for further use after it has been in operation.

It will be apparent from the foregoing that the measuring system is a device for measuring the ratio between two frequencies and that it does not demand in any way upon a knowledge of the value of the frequencies involved.

While reference has heretofore been made to the reflection of the transmitted wave by the object it may be desirable in some cases for the transmitted wave to be re-radiated. In such a case the transmitted wave would be received by a receiver carried by the moving object and this wave may be radiated either on the same freqency or after its frequency has been changed in known manner in accordance with methods well known to those familar with communication arts. If such a procedure is adopted, the re-transmitted wave would be received and the formula would be modified to take into account the change of frequency accomplished at the moving body.

It will be appreciated that the invention not only provides means for deducing the velocity of a moving object, but also provides means for ascertaining the rate of any decrease or increase in velocity that may occur while the object is within the operating range of the apparatus thus simplifying investigations into the acceleration of deceleration of moving bodies.

Having now described our invention what we claim as new and desire to secure by Letters Patent is:

1. Apparatus for the measurement of the velocity of a moving object, comprising means for transmitting waves onto the object, means for receiving waves reflected from the object, means for mixing the reflected waves and waves of the frequency of the transmitted waves so as to produce a beat frequency, and means to measure the ratio between the beat frequency and the frequency of the transmitted waves so that the velocity of the object may be ascertained.

2. Apparatus for the measurement of the velocity of a moving object, comprising means for generating radio waves, means for multiplying the frequency of the radio waves, means for transmitting the waves of the multiplied frequency onto the object, means for receiving waves reflected from the object, means for mixing the reflected waves and waves of the multiplied frequency so as to produce a beat frequency, and means to measure the ratio between the beat frequency and the frequency of the generated waves so that the velocity of the object may be ascertained.

3. Apparatus for the measurement of the velocity of a moving object, comprising means for transmitting waves onto the object, means for receiving waves reflected from the object, means for mixing the reflected waves and waves of the frequency of the transmitted waves so as to produce a beat frequency, and means to measure the ratio between the beat frequency and the frequency of the transmitted wave including an electronic counter system for counting the number of cycles of the transmitted waves occurring during each cycle of the beat frequency.

4. Apparatus for the measurement of the velocity of a moving object, comprising means for generating radio waves, means for multiplying the frequency of the radio waves, means for transmitting the waves of the multiplied frequency onto the object, means for receiving waves reflected from the object, means for mixing the reflected waves and waves of the multiplied frequency so as to produce a beat frequency, and means for measuring the ratio between the beat frequency and the frequency of the generated waves including an electronic counter system for counting the number of cycles of the generated waves occurring during each cycle of the beat frequency.

5. Apparatus for the measurement of the velocity of a moving object, comprising means for transmitting waves onto the object, means for receiving waves reflected from the object, means for mixing the reflected waves and waves of the frequency of the transmitted waves so as to produce a beat frequency, and an electronic counter system for counting the number of cycles of the transmitted waves during each cycle of the beat frequency, said system including an electronic counter responsive to the transmitted waves and an electronic switch for activating the electronic counter for the duration of a cycle of the beat frequency, whereby the ratio between the beat frequency and the frequency of the transmitted waves may be evaluated so that the velocity of the object may be ascertained.

6. Apparatus for the measurement of the velocity of a moving object, comprising means for generating radio waves, means for multiplying the frequency of the radio waves, means for transmitting the waves of the multiplied frequency onto the object, means for receiving waves reflected from the object, means for mixing the reflected waves and waves of the multiplied frequency so as to produce a beat frequency, and an electronic counter system for counting the number of cycles of the generated waves during each cycle of the beat frequency, said system including an electronic counter responsive to the transmitted waves, and an electronic switch for activating the electronic counter for the duration of a cycle of the beat frequency, whereby the ratio between the beat frequency and the frequency of the generated waves may be evaluated so that the velocity of the object may be ascertained.

7. Apparatus for the measurement of the velocity of a moving object, comprising means for transmitting waves onto the object, means for receiving waves reflected from the object, means for mixing the reflected waves and waves of the frequency of the transmitted waves so as to produce a beat frequency, and an electronic counting system including a plurality of electronic counters each responsive to the transmitted waves, and an electronic switch for activating each electronic counter for the duration of a cycle of the beat frequency, the electronic counters and electronic switches being successively connected at predetermined time intervals into circuit by means of a time delay switching circuit, whereby the ratio existing between the beat frequency and the frequency of the transmitted waves at said predetermined intervals may be evaluated so that the rate of change of the velocity of the object may be ascertained.

8. Apparatus for the measurement of the velocity of a moving object, comprising means for generating radio waves, means for multiplying the frequency of the radio waves, means for transmitting the waves of the multiplied frequency onto the object, means for receiving waves reflected from the object, means for mixing the reflected waves and waves of the multiplied frequency so as to produce a beat frequency, an electronic counting system including a plurality of electronic counters each responsive to the transmitted waves, and an electronic switch for activating each electronic counter for the duration of a cycle of the beat frequency, the electronic counters and electronic switches being successively connected into circuit at predetermined time intervals by means of a time delay switching circuit, whereby the ratio existing between the beat frequency and the frequency of the generated waves at said predetermined intervals may be evaluated so that the rate of change of the velocity of the object may be ascertained.

9. Apparatus for the measurement of the velocity of a moving object, comprising means for transmitting waves onto the object, means for receiving waves reflected from the object, means for mixing the reflected waves and waves of the frequency of the transmitted waves so as to produce a beat frequency, means to derive a voltage pulse for each cycle of the beat frequency, and an electronic counter system for counting the number of cycles of the transmitted waves during each cycle of the beat frequency, said system including an electronic counter responsive to the transmitted waves, and an electronic switch responsive to two successive voltage pulses for activating the electronic counter for the duration of a cycle of the beat frequency, whereby the ratio between the beat frequency and the frequency of the transmitted waves may be evaluated so that the velocity of the object may be ascertained.

10. Apparatus for the measurement of the velocity of a moving object, comprising means for generating radio waves, means for multiplying the frequency of the radio waves, means for transmitting the waves of the multiplied frequency onto the object, means for receiving waves reflected from the object, means for mixing the reflected waves and waves of the multiplied frequency, so as to produce a beat frequency, means to derive a voltage pulse for each cycle of the beat frequency, and an electronic counter system for counting the number of cycles of the generated waves during each cycle of the beat frequency, said system including an electronic counter responsive to the transmitted waves, and an electronic switch responsive to two successive voltage pulses for activating the electronic counter for the duration of a cycle of the beat frequency, whereby the ratio between the beat frequency and the frequency of the generated waves may be evaluated so that the velocity of the object may be ascertained.

ANDRÉ WILLEM STORM.
GERRIT MAK.

REFERENCES CITED

The following references are of record in the file of this patent:

UNITED STATES PATENTS

| Number | Name | Date |
|---|---|---|
| 2,206,896 | Higgins | July 9, 1940 |
| 2,324,077 | Goodale | July 13, 1943 |
| 2,403,625 | Wolff | July 9, 1946 |
| 2,405,597 | Miller | Aug. 13, 1946 |
| 2,407,000 | Evans | Sept. 3, 1946 |
| 2,412,003 | Neufeld | Dec. 3, 1946 |
| 2,423,023 | Hershberger | June 24, 1947 |
| 2,495,795 | Weston | Jan. 31, 1950 |

Certificate of Correction

Patent No. 2,524,610                                  October 3, 1950

ANDRÉ WILLEM STORM ET AL.

It is hereby certified that error appears in the printed specification of the above numbered patent requiring correction as follows:

Column 3, line 14, for "$F_s$" read $f_3$; line 27, for "at" read *as*; column 5, line 38, for the word "demand" read *depend*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*